United States Patent
Forsberg

(10) Patent No.: US 11,828,290 B2
(45) Date of Patent: Nov. 28, 2023

(54) ROTOR SECTION WITH ATTACHED BEARING SLEEVES FOR SUBMERSIBLE PUMP MOTOR

(71) Applicant: Baker Hughes Oilfield Operations LLC, Houston, TX (US)

(72) Inventor: Michael Forsberg, Claremore, OK (US)

(73) Assignee: BAKER HUGHES OILFIELD OPERATIONS, LLC, Houston, TX (US)

( * ) Notice: Subject to any disclaimer, the term of this patent is extended or adjusted under 35 U.S.C. 154(b) by 21 days.

(21) Appl. No.: 17/481,634

(22) Filed: Sep. 22, 2021

(65) Prior Publication Data
US 2022/0090603 A1 Mar. 24, 2022

Related U.S. Application Data

(60) Provisional application No. 63/081,439, filed on Sep. 22, 2020.

(51) Int. Cl.
| | |
|---|---|
| *F04D 13/10* | (2006.01) |
| *F04D 13/08* | (2006.01) |
| *H02K 5/132* | (2006.01) |
| *F04D 29/047* | (2006.01) |

(52) U.S. Cl.
CPC ........... *F04D 13/10* (2013.01); *F04D 13/086* (2013.01); *F04D 29/047* (2013.01); *H02K 5/132* (2013.01)

(58) Field of Classification Search
CPC ...... F04D 13/10; F04D 13/086; F04D 29/046; F04D 29/0462; F04D 29/047; H02K 1/28; H02K 5/132
See application file for complete search history.

(56) References Cited

U.S. PATENT DOCUMENTS

| | | | | |
|---|---|---|---|---|
| 3,990,802 A | * | 11/1976 | Corona | H02K 1/28 310/216.116 |
| 4,453,099 A | * | 6/1984 | Flat | H02K 5/132 310/90 |
| 6,837,621 B1 | * | 1/2005 | Sakamoto | F04D 29/047 384/97 |
| 8,342,821 B2 | * | 1/2013 | Prieto | H02K 7/04 310/90 |
| 2012/0257985 A1 | * | 10/2012 | Parmeter | F04D 29/047 417/53 |
| 2013/0293061 A1 | | 11/2013 | Neuroth et al. | |
| 2014/0127052 A1 | | 5/2014 | Knapp | |
| 2017/0098974 A1 | * | 4/2017 | Clingman | F04D 13/10 |

OTHER PUBLICATIONS

ISR and the Written Opinion of the ISA, dated Jan. 3, 2022, for PCT/US2021/071548 (MOT-64773-WO-3), 12 pages.

* cited by examiner

*Primary Examiner* — Kenneth J Hansen
(74) *Attorney, Agent, or Firm* — BRACEWELL LLP; Keith R. Derrington

(57) ABSTRACT

A submersible well pump assembly having a motor with a shaft, a stator, a rotor coupled to the shaft, and bearing sleeves between the shaft and a bearing assembly. The rotor includes a number of rotor sections located along an axis of the shaft, where each rotor section includes a stack of rotor disks and end rings on each end of the stack. Each bearing sleeve attaches to an end ring and extends axially away from the end ring into abutment with an end of another bearing sleeve attached to an adjacent end ring.

14 Claims, 5 Drawing Sheets

ROTOR SECTION WITH ATTACHED BEARING SLEEVES FOR SUBMERSIBLE PUMP MOTOR

CROSS-REFERENCE TO RELATED APPLICATION

This application claims priority from U.S. Provisional Application Ser. No. 63/081,439, filed Sep. 22, 2020, the full disclosures of which are incorporated by reference herein in their entireties and for all purposes.

BACKGROUND OF THE INVENTION

1. Field of Invention

The present disclosure relates in general to electrical submersible well pumps (ESP) and in particular to an ESP motor with rotor sections having bearing sleeves attached to opposite ends.

2. Description of Prior Art

Electrical submersible pump assemblies ("ESP") are commonly used to pump well fluid from hydrocarbon producing wells. A typical ESP has a rotary pump driven by an electrical motor. The motor is filled with a dielectric motor oil. A pressure equalizer couples to the motor to reduce a pressure differential between the motor oil and the hydrostatic pressure of the well fluid.

The motor has a stator with windings that are normally configured in a three-phase arrangement. The stator has a central bore in which a rotor is located. The rotor is made up of a number of rotor sections mounted on a shaft for rotation in unison. Radial bearings separate the rotor sections from each other and frictionally engage the bore of the stator to prevent rotation of the radial bearing and radially stabilize the shaft.

Each rotor section has a large number of thin disks or laminations. Each disk has a central opening and a number of slots spaced circumferentially around the central opening. Copper rods extend through the slots and attach to end rings at opposite end of the rotor section. The central openings of the disks slide over the shaft. A slot and key arrangement secures the disks to the shaft for rotation in unison. Radial support bearings for the shaft are located between opposing ends of each rotor section.

While these motors work well, rotor sections must be balanced before assembly in the motor to reduce vibration of the shaft. A small annular clearance between the disks and shaft is required in order to slide the rotor sections over the shaft. It is possible for a balanced rotor section to have a slightly different axis of rotation than the shaft because of the annular clearance, causing vibration during operation.

SUMMARY OF THE INVENTION

Disclosed herein is an example of a submersible well pump assembly motor having a housing, a stator mounted in the housing and made up of a stack of stator disks, each of the stator disks having a central opening defining a stator bore with a longitudinal axis. The motor of this example also includes a rotatable shaft mounted on the axis, first and second rotor sections mounted to the shaft for rotating the shaft in response to an electromagnetic field emanating from the stator, each of the rotor sections having a stack of rotor disks secured together by end rings on opposite ends of each of the rotor sections, each of the rotor disks having a central opening, defining a rotor section bore through which the shaft extends. Also included are a first bearing sleeve protruding from one of the end rings of the first rotor section toward the second rotor section, and a second bearing sleeve protruding from one of the end rings of the second rotor section toward the first rotor section, each of the bearing sleeves having an outer wall rigidly secured to one of the end rings, the shaft extending through each of the bearing sleeves, a bearing carrier having an inner diameter that receives the outer walls of bearing sleeves of adjacent ones of the rotor sections in rotating and sliding engagement, and an anti-rotation member on an exterior of the bearing carrier that engages the stator to prevent rotation of the bearing carrier. Optionally, each of the bearing sleeves has an inner diameter that is the same as an inner diameter of the central opening of each of the rotor disks. The first and second bearing sleeves optionally have protruding ends that abut each other. In an alternative, the first bearing sleeve has a recessed end that is flush with an end of the stack of rotor disks of the first rotor section and the second bearing sleeve has a recessed end that is flush with an end of the stack of rotor disks of the second rotor section. In an embodiment a shaft key slot is on an exterior of the shaft, a rotor section key slot in the rotor section disk of each of the rotor sections that mates with the shaft key slot, a bearing sleeve key channel in each of the bearing sleeves that aligns with the shaft key slot, a key is extending through the mating rotor section key slots and the shaft key slot for transferring torque from each of the rotor sections to the key and from the key to the shaft, the key also extending through the mating bearing sleeve key channel and the shaft key slot, and each of the bearing sleeve key channels being configured such that the key is spaced from any surface of the bearing sleeve key channel that could transfer torque from the bearing sleeve to the shaft. In this example, the key has a rearward facing surface facing opposite a forward direction of rotation of each of the rotor sections during operation, each of the bearing sleeve key channels has a forward facing surface facing into the forward direction of rotation of each of the rotor sections during operation, and a gap exists between the forward facing surface of each of the bearing sleeve key channels and the rearward facing surface of the key. In an example, an annular clearance exists between the central openings of the rotor disks and the shaft.

Another example of a submersible well pump assembly motor includes a housing having a longitudinal axis, a bearing carrier mounted inside the housing, the bearing carrier having an axial bore, a stator inside the housing that is selectively energized with electricity, the stator having a longitudinally extending stator bore, a shaft inserted into the stator bore, a first rotor section structurally affixed to the shaft, a first end ring structurally affixed to an end of the first rotator section, the first end ring circumscribing the shaft, a first bearing sleeve structurally affixed to the first end ring, the first bearing sleeve having a portion disposed in an annular space between the first end ring and the shaft and another portion inserted into an end of the bearing carrier bore, a second rotor section structurally affixed to the shaft, a second end ring structurally affixed to an end of the second rotator section, the second end ring circumscribing the shaft, and a second bearing sleeve structurally affixed to the second end ring, the second bearing sleeve having a portion disposed in an annular space between the second end ring and the shaft, and an end distal from the second end ring inserted into an end of the bearing carrier bore opposite the first bearing sleeve. Optionally, the first and second end rings and respective first and second bearing sleeve are uni-body members. In alternatives, ends of the first and second bearing sleeves are first and second protruding rings, and wherein the first and second protruding rings are in selective abutting contact. In one embodiment, the first and second rotor sections, end rings, and bearing sleeves respectively define first and second rotor assemblies, the motor further having three or more rotor assemblies. In an alternate embodiment, a third end ring and third bearing sleeve are on an end of the first rotor section distal from the first end ring, and a fourth end ring and fourth bearing sleeve are on an end of the second rotor section distal from the second end ring. The motor further optionally includes a key and key slots formed axially along opposing outer surfaces of the rotor and shaft, so that when the key is inserted into the key slots the rotor and shaft are structurally affixed to one another. An inner surface of the bearing sleeves is optionally spaced radially away from the shaft.

A method of operating a motor in a submersible well pump assembly is also disclosed and that includes obtaining a motor housing, a motor shaft, a rotor stack having an end ring on an end of the stack, and an annular bearing sleeve with a portion that inserts into a bore in the end ring and a protruding section that projects axially away from the portion, the rotor stack, end ring, and bearing sleeve comprising a rotor assembly. The rotor assembly is then balanced and mounted onto the shaft and the motor is energized to rotate the shaft. In one example, the motor is disposed in a wellbore and the shaft rotated to urge liquid in the wellbore to production tubing in the wellbore. In method optionally further includes rotationally affixing the shaft with the rotor. In an example, the rotor assembly includes a first rotor assembly, the method further includes mounting a plurality of motor assemblies to the shaft.

BRIEF DESCRIPTION OF DRAWINGS

Some of the features and benefits of the present invention having been stated, others will become apparent as the description proceeds when taken in conjunction with the accompanying drawings, in which.

Figure 1:
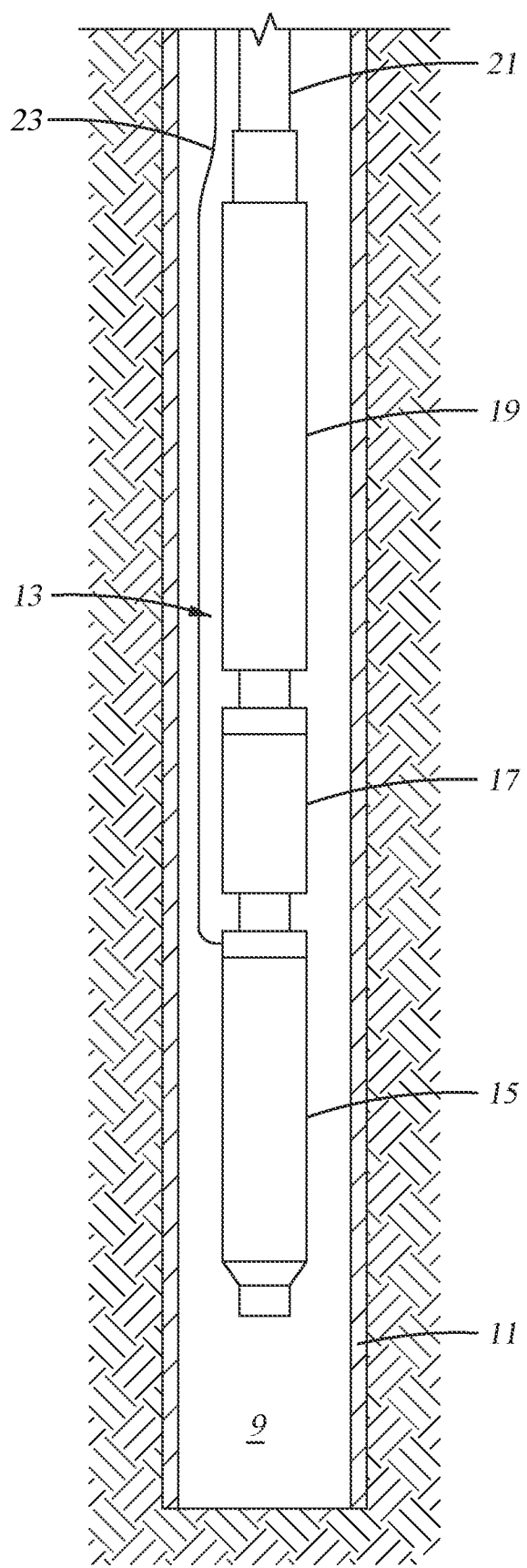
FIG. 1 is a side view of an electrical submersible well pump assembly having a motor with a rotor constructed in accordance with this disclosure.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Referring to FIG. 1, an example of a well 9 is shown in cross sectional view with a string of casing 11 cemented within. An electrical submersible pump (ESP) 13 pumps well fluid flowing inside casing 11, such as through perforations (not shown) radially penetrating the casing 11 and formation surrounding the well 9. ESP 13 includes a motor 15, which is typically a three-phase electrical motor. An upper end of motor 15 connects to a seal section 17 that seals dielectric lubricant in motor 15. The terms "upper", "lower" and the like are used only for convenience as ESP 13 may be operated in other orientations than vertical. Seal section 17 optionally includes a pressure equalizing element to equalize the pressure of the lubricant in motor 15 with the hydrostatic pressure of the well fluid on the exterior of motor 15.

A pump 19 connects to seal section 17. Pump 19 has an intake for receiving well fluid from casing 11 and a discharge connected to a string of production tubing 21 in this example. In examples an upper end of tubing 21 connects to a wellhead assembly on surface (not shown). Pump 19 is normally a rotary type, such as a centrifugal pump having a large number of stages, each stage having a rotating impeller and a nonrotating diffuser. Alternately, pump 19 is another type of pump, such as a progressing cavity pump. A power cable 23 with a motor lead on a lower end extends alongside tubing 21 to motor 15 for supplying power. Optionally, a power source (not shown) is provided on surface for providing electricity to power cable 23.

Figure 2:
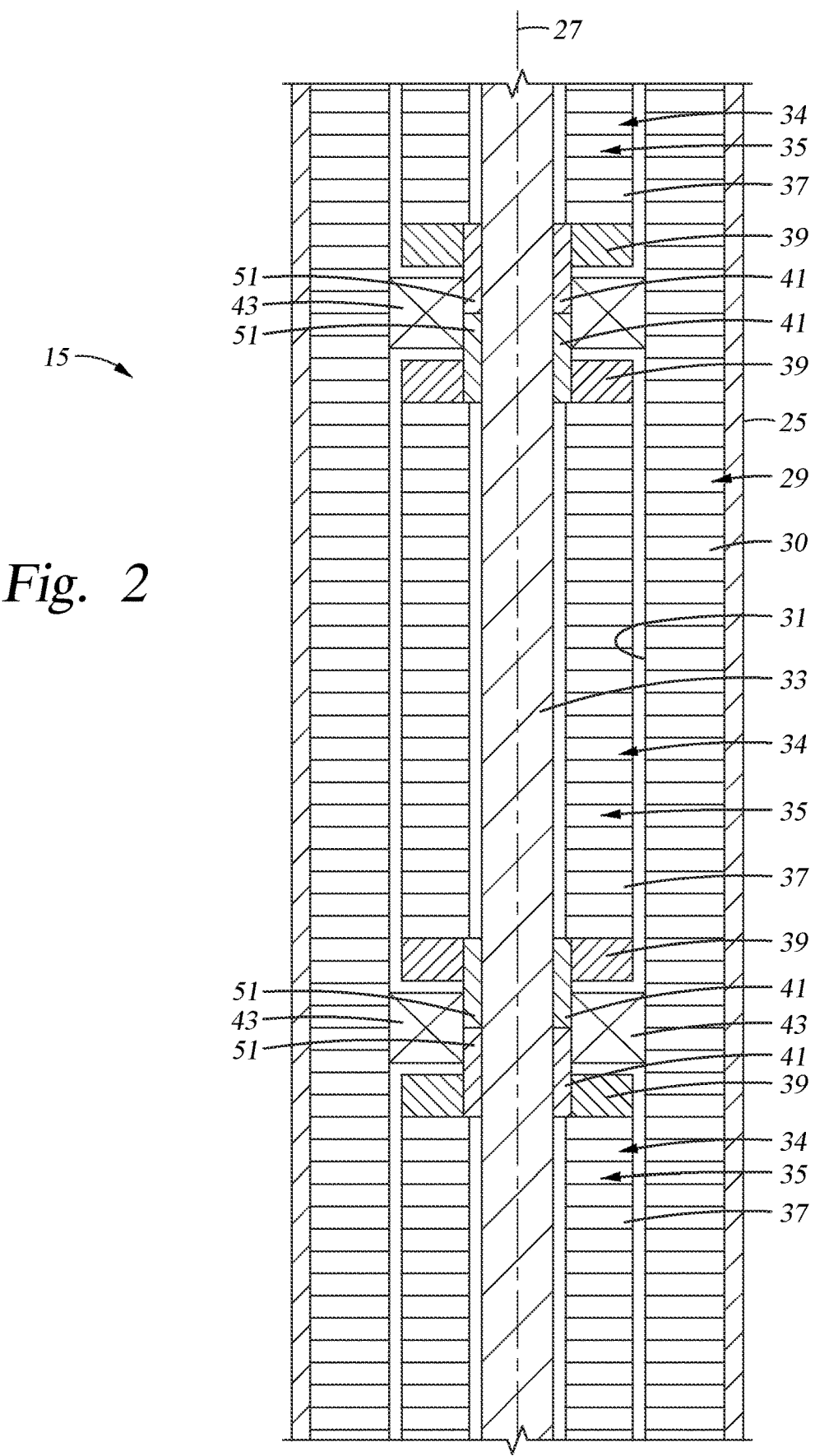
FIG. 2 is a schematic sectional view of part of the motor of FIG. 1, illustrating rotor sections of the rotor attached to bearing sleeves in accordance with this disclosure.

Referring to FIG. 2, motor 15 is shown in cross section having a tubular housing 25 with a longitudinal axis 27. A stator 29 fits non-rotatably in housing 25. Stator 29 is made up of a large number of steel stator disks 30 or laminations shown stacked on top of each other. Motor windings (not shown) extend through slots in stator disks 30, the windings being connected to power cable 23 (FIG. 1). Stator 29 has a stator bore 31 through which a drive shaft 33 extends.

Shaft 33 supports a rotor 34 made up of a number of rotor sections 35 that cause shaft 33 to rotate when electrical power is supplied to stator 29. Each rotor section 35 is made up of a stack of steel laminations or rotor disks 37. End rings 39, which in an example include copper, are shown on opposite ends of each rotor section 35 and secure the rotor disks 37. In examples, rotor sections 35 are about 1 to 2 feet in length and axially spaced apart from each other a shorter distance.

Also in FIG. 2 are annular bearing sleeves 41, each shown with an axial end inserted within a corresponding end ring 39. In an example, each bearing sleeve 41 is structurally secured to its corresponding end ring 39. In a non-limiting example, members being structurally secured to one another refers to a securement, mounting, or coupling in which a load is transferred between the members. As shown, axial lengths of each bearing sleeve 41 exceeds the axial length of its corresponding end ring 39 and extends in a direction away from the rotor section 35 abutting the corresponding end ring 39 and past the end of the end ring 39. The bearings sleeves 41 attached to adjacent end rings 39 extend toward each other. In embodiments, each bearing sleeve 41 is a rigid annular member, optionally formed from a metal such as steel. In examples, the bearing sleeve 41 wall thickness ranges from about 3/16 to 1/4 inch. An example of an annular bearing carrier 43 is illustrated with an inner diameter that receives a pair of bearing sleeves 41 that project away from adjacent rotor sections 35. In the example of FIG. 2, bearing sleeves 41 rotate with rotor sections 35 and shaft 33 while bearing carrier 43 does not rotate relative to stator 29. The engagement of bearing sleeves 41 with bearing carrier 43 is rotational and sliding.

Figure 3:
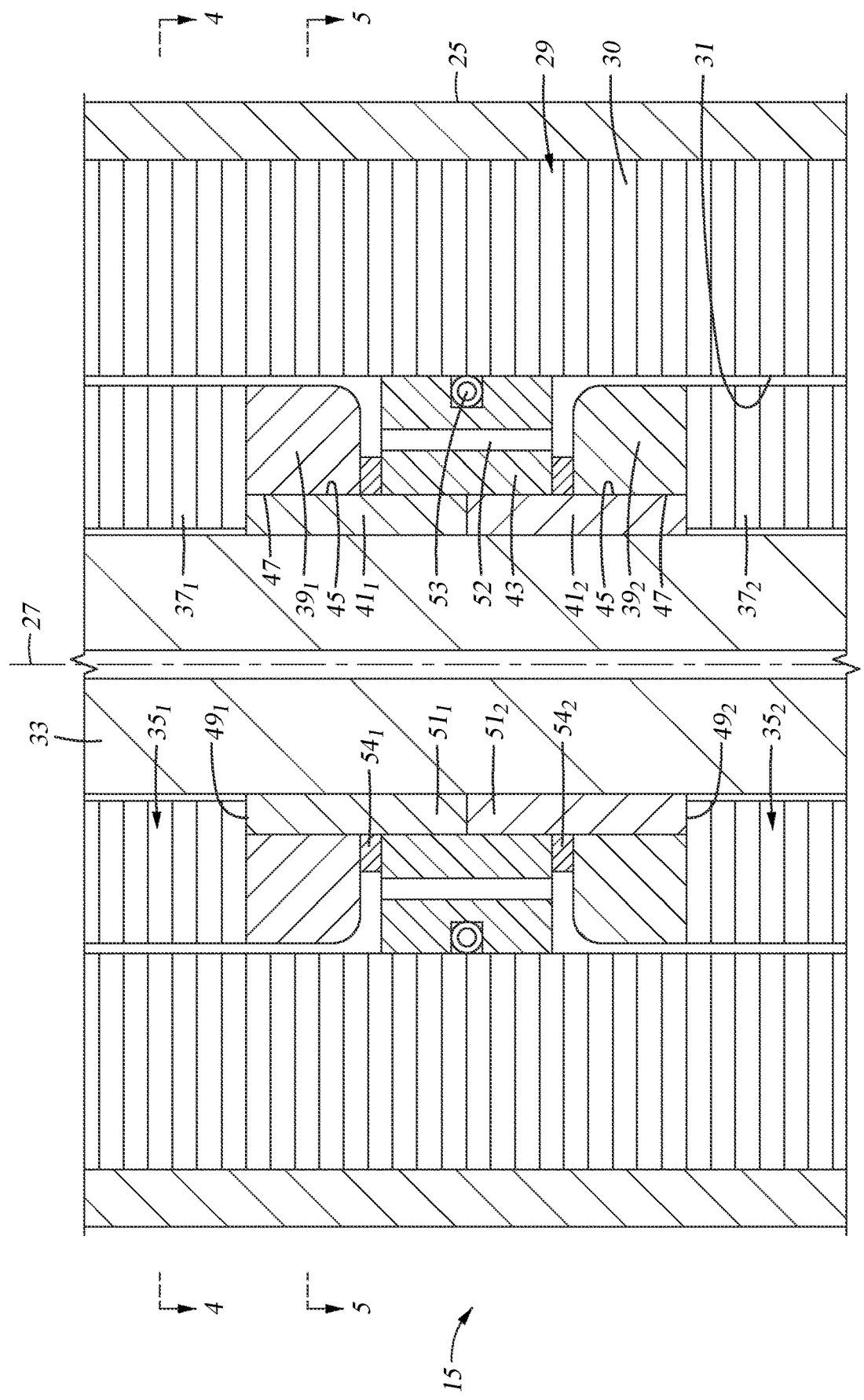
FIG. 3 is an enlarged sectional view of end portions of two of the rotor sections shown in FIG. 2.

Referring to FIG. 3, which shows an example of the motor 15 of FIG. 2 in greater detail, each bearing sleeve $41_{1,2}$ has an outer diameter surface 45 that is affixed to an inner diameter surface 47 of one of the end rings $39_{1,2}$. The attachment occurs alternatively in a variety of ways, such as threads, an interference fit, or brazing. In this example, bearing sleeves $41_{1,2}$ are affixed by a shrink or interference fit technique. In an alternative, bearing sleeves $41_{1,2}$ and end rings $39_{1,2}$ are part of a uni-body construction. Each bearing sleeve $41_{1,2}$ has a recessed end $49_{1,2}$ that is flush with an end of the stack of rotor disks 37 and also flush with a side of an end ring 39 that contacts the stack of rotor disks 37. Each bearing sleeve $41_{1,2}$ protrudes from its end ring 39 toward an adjacent rotor section 35. Protruding ends $51_{1,2}$ of each of the bearing sleeves $41_{1,2}$ are defined by the portion of the sleeves $41_{1,2}$ extending axially past their corresponding end rings $39_{1,2}$. In an example, axial lengths of each of the protruding ends $51_{1,2}$ are about half the axial distance between end rings $39_{1,2}$ of adjacent rotor sections $35_{1,2}$. In this example, the protruding end $51_1$ of bearing sleeve $41_1$ connected to rotor section $35_1$ abuts the protruding end $51_2$ of the bearing sleeve $41_2$ of the adjacent rotor section $35_2$.

In the example shown each bearing carrier 43 has an axial dimension less than a distance between end rings $39_{1,2}$ of adjacent rotor sections $35_{1,2}$. The present example includes flow passages 52 depicted extending from the lower to the upper side of bearing carrier 43 to facilitate movement of lubricant contained in stator bore 31. An example of an anti-rotation member 53 is shown that engages the sidewall of stator bore 31 in a conventional manner to prevent rotation of bearing carrier 43 relative to stator 29. In this example, anti-rotation member 53 is a coil spring in a groove encircling bearing carrier 43, in alternatives a variety of other anti-rotation members are used.

In one example, thermal growth causes some axial movement of rotor sections $35_{1,2}$ relative to bearing carrier 43. In one embodiment, a washer $54_1$ is shown located between the upper side of bearing carrier 43 and the end ring $39_1$ of the next upward rotor section $35_1$. Further in this embodiment, another washer $54_2$ is illustrated located between the lower side of bearing carrier 43 and the end ring $39_2$ of the next lower rotor section $35_2$. Washers $54_{1,2}$ retard wear on end rings $39_{1,2}$ due to contact with bearing carrier 43 that might occur during operation. Example materials of the washers $54_{1,2}$ include thermoplastic material or other materials.

Figure 4:
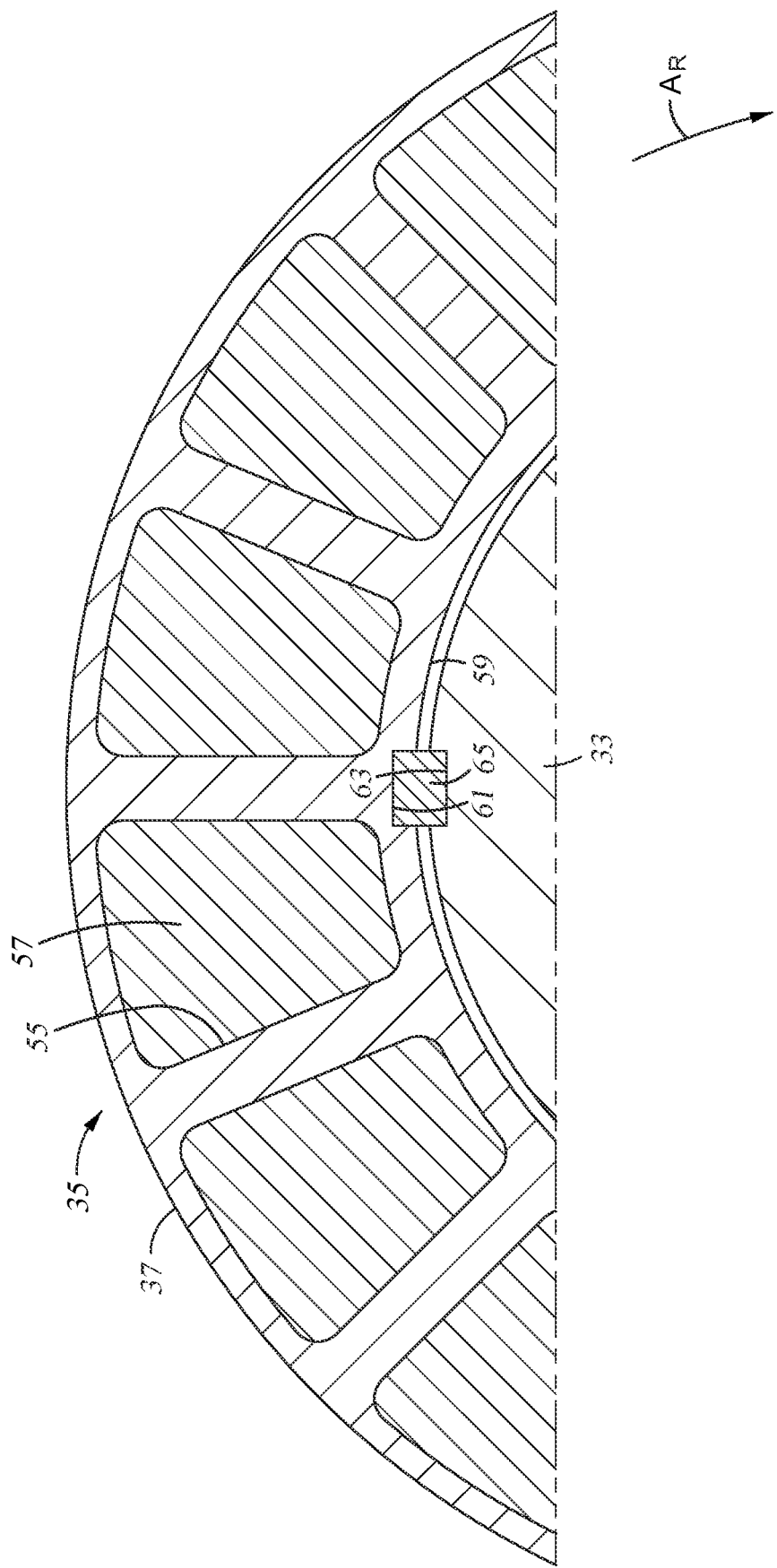
FIG. 4 is a transverse sectional view, taken along the line 4-4 of FIG. 3.

Referring to FIG. 4, an example planar view of a portion of a rotor disk 37 is shown having apertures 55 formed axially through the disk 37 and sequentially arranged at angularly spaced apart locations proximate an outer radius of the disk 37. In this example, disks 37 of each rotor section 35 (FIG. 3) are arranged so the apertures 55 in each disk 37 align to form spaces in which elongated metal rods 57 are inserted that extend along an axial length of each rotor section 35. The shape of apertures 55 where rods 57 are inserted is shown as trapezoidal, but may vary. Rods 57 in this example include electrically conducting metal, such as copper, and whose opposing ends are joined to end rings 39 disposed at opposite ends of each rotor section 35. Each rotor disk 37 has a central opening 59 (FIG. 3) through which shaft 33 extends. The inner diameter of central opening 59 is slightly larger than the outer diameter of shaft 33 providing a clearance to enable rotor sections 35 to slide over shaft 33 during assembly. The inner diameter of each bearing sleeve 41 as shown (FIG. 3) is substantially the same as the inner diameter of central opening 59.

In the example of FIG. 4, a rotor key slot 61 is formed axially through each disk 37 and which extends radially outward from the central opening 59 of the disk 37. When each disk 37 is angularly aligned, rotor key slot 61 extends axially along the length of the stack of rotor disks 37 parallel to axis 27 (FIG. 3). A shaft key slot 63 extends along most of the length of shaft 33 and shown complementary to the rotor key slot 61. A key 65 is shown axially inserted within the mating rotor key slot 61 and shaft key slot 63. In this example, key 65 is rectangular but other shapes are feasible. An electromagnetic field generated by stator 29 (FIG. 3) causes rotor section 35 to rotate, as indicated by arrow $A_R$. Key 65 transfers torque produced by rotor section 35 to shaft 33, causing it to rotate.

Figure 5:
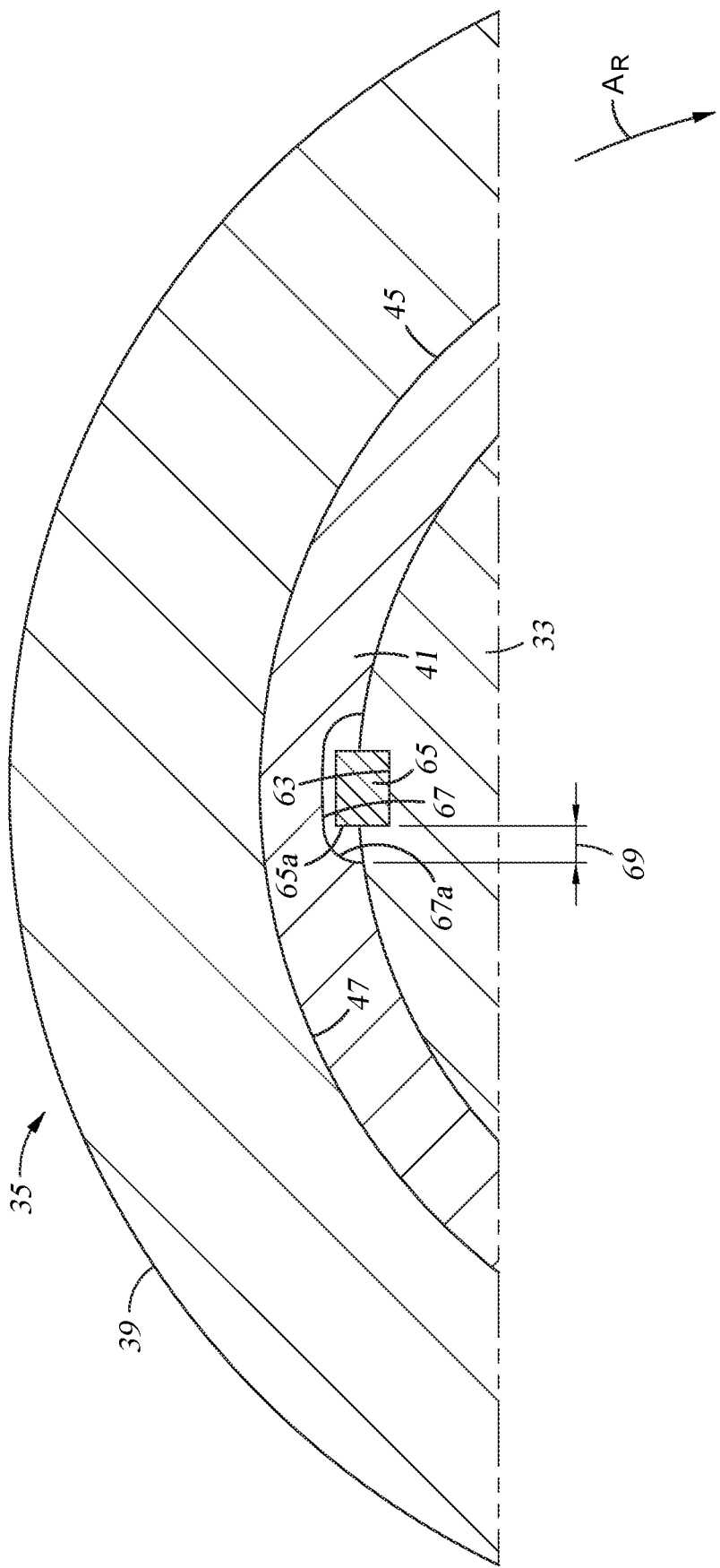
FIG. 5 is a transverse sectional view, taken along the line 5-5 of FIG. 3.

Referring to FIG. 5, the rotation of rotor section 35 also causes its bearing sleeves 41 to rotate in unison because of the rigid attachment of each bearing sleeve 41 to one of the end rings 39. In this embodiment, the inner diameter of bearing sleeve 41 has an axially extending bearing sleeve key slot or channel 67 that registers with shaft key slot 63. Shaft key 65, which may be continuous or in shorter length segments, extends through bearing sleeve channel 67 and shaft key slot 63. Bearing sleeve channel 67 is configured so as to prevent bearing sleeve 41 from transferring torque through shaft key 65 to shaft 33. All of the torque applied to shaft 33 comes from rotor section key slot 61 (FIG. 4). In this example, bearing sleeve channel 67 is wider than shaft key 65 and shaft key slot 63 to prevent any torque transfer from bearing sleeve 43 to shaft 33.

Bearing sleeve key channel 67 has a forward facing side edge 67a that faces the same direction as the direction of rotation. Shaft key 65 has a rearward facing side edge 65a that faces in an opposite direction to the direction of rotation. Bearing sleeve key channel side edge 67a is circumferentially spaced from shaft key side edge 65a by a gap 69 to prevent torque transferring contact between channel side edge 67a and shaft key side edge 65a. In a non-limiting example of operation, dimension of the gap 69 remains substantially the same during normal operation preventing torque transfer from bearing sleeve 41 to shaft 33. In the example shown bearing sleeve key channel forward facing side edge 67a is an angled chamfer rather than being in a radial plane of axis 27 (FIG. 3) so as to reduce the chances for any torque transfer.

In embodiments that mount the bearing sleeves $41_{1,2}$ to the end rings $39_{1,2}$, the sleeves $41_{1,2}$ are then directly coupled to the rotor 35; which provides an advantage of the ability to balance the rotor 35 using the bearing sleeves $41_{1,2}$ and after the bearing sleeves $41_{1,2}$ and rotor 35 are structurally affixed instead of a mandrel to determine a rotational center. Balancing the rotor 35 and bearing sleeves $41_{1,2}$ after they are combined preserves the rotational center of the combination after assembly. Another advantage provided by the present disclosure is removing the positional variation of the rotor 35 to the axis of rotation due to the gap required between the bearing sleeves $41_{1,2}$ and shaft 35, as well as the rotor 35 and shaft 33 for assembly. While not intended to be bound by theory, it is believed that in embodiments in which sleeves $41_{1,2}$ are structurally mounted to the rotor 35 have load paths between the shaft 33 and rotor 35 that are different from embodiments with sleeves with bearing sleeves not structurally mounted to the rotors. In embodiments described herein, loads transfer from the shaft 33 to the sleeves $41_{1,2}$ and to the rotor 35 and vice versa. Whereas in embodiments where sleeves are not structurally mounted to the rotor, radial loads are transferred directly between the rotor and shaft and without passing through the sleeves; which increases a potential for the rotor being offset from the rotational axis of the combined rotor, shaft, and bearing sleeve assembly.

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. For example, bearing sleeves 41 are machined after being attached to the rotors 35. This and other similar modifications will readily suggest themselves to those skilled in the art, and are intended to be encompassed within the spirit of the present invention disclosed herein and the scope of the appended claims.

What is claimed is:

1. A submersible well pump assembly motor, comprising:
a housing;
a stator mounted in the housing and made up of a stack of stator disks, each of the stator disks having a central opening defining a stator bore with a longitudinal axis;
a rotatable shaft mounted on the axis;
first and second rotor sections mounted to the shaft for rotating the shaft in response to an electromagnetic field emanating from the stator, each of the rotor sections having a stack of rotor disks secured together by end rings on opposite ends of each of the rotor sections, each of the rotor disks having a central opening, defining a rotor section bore through which the shaft extends;
a first bearing sleeve protruding from one of the end rings of the first rotor section toward the second rotor section, and a second bearing sleeve protruding from one of the end rings of the second rotor section toward the first rotor section, each of the bearing sleeves having an outer wall rigidly secured to and in direct contact with an inner annular wall of one of the end rings and axial ends in direct contact with ends of adjacent rotor sections, the shaft extending through each of the bearing sleeves;
a bearing carrier having an inner diameter that receives the outer walls of bearing sleeves of adjacent ones of the rotor sections in rotating and sliding engagement; and
an anti-rotation member on an exterior of the bearing carrier that engages the stator to prevent rotation of the bearing carrier.

2. The motor according to claim 1, wherein
each of the bearing sleeves has an inner diameter that is the same as an inner diameter of the central opening of each of the rotor disks.

3. The motor according to claim 1, wherein,
the first and second bearing sleeves have protruding ends that abut each other.

4. The motor according to claim 1, wherein:
the first bearing sleeve has a recessed end that is flush with a one of the end rings adjacent an end of the stack of rotor disks of the first rotor section; and
the second bearing sleeve has a recessed end that is flush with a one of the end rings adjacent an end of the stack of rotor disks of the second rotor section.

5. The motor according to claim 1, further comprising:
a shaft key slot on an exterior of the shaft;
a rotor section key slot in the rotor section disk of each of the rotor sections that mates with the shaft key slot;
a bearing sleeve key channel in each of the bearing sleeves that aligns with the shaft key slot;
a key extending through the mating rotor section key slots and the shaft key slot for transferring torque from each of the rotor sections to the key and from the key to the shaft;
the key also extending through the mating bearing sleeve key channel and the shaft key slot; and
each of the bearing sleeve key channels being configured such that the key is spaced from any surface of the bearing sleeve key channel that could transfer torque from the bearing sleeve to the shaft.

6. The motor according to claim 5 wherein:
the key has a rearward facing surface facing opposite a forward direction of rotation of each of the rotor sections during operation;
each of the bearing sleeve key channels has a forward facing surface facing into the forward direction of rotation of each of the rotor sections during operation; and
a gap exists between the forward facing surface of each of the bearing sleeve key channels and the rearward facing surface of the key.

7. The motor according to claim 1, wherein an annular clearance exists between the central openings of the rotor disks and the shaft.

8. A submersible well pump assembly motor, comprising:
a housing having a longitudinal axis;

a bearing carrier mounted inside the housing, the bearing carrier having an axial bore;

a stator inside the housing that is selectively energized with electricity, the stator having a longitudinally extending stator bore;

a shaft inserted into the stator bore;

a first rotor section structurally affixed to the shaft;

a first end ring structurally affixed to an end of the first rotor section, the first end ring circumscribing the shaft;

a first bearing sleeve structurally affixed to and in direct contact with an inner surface of the first end ring and in direct contact with the first rotor section, the first bearing sleeve having a portion disposed in an annular space between the first end ring and the shaft and another portion inserted into an end of the bearing carrier bore;

a second rotor section structurally affixed to the shaft;

a second end ring structurally affixed to an end of the second rotor section, the second end ring circumscribing the shaft; and a second bearing sleeve structurally affixed to and in direct contact with an inner radial surface of the second end ring and in direct contact with the second rotor section, the second bearing sleeve having a portion disposed in an annular space between the second end ring and the shaft, and an end distal from the second end ring inserted into an end of the bearing carrier bore opposite the first bearing sleeve.

9. The motor according to claim 8, wherein the ends of the first and second bearing sleeves comprise first and second protruding rings, and wherein the first and second protruding rings are in selective abutting contact.

10. The motor according to claim 8, wherein the first and second rotor sections, end rings, and bearing sleeves respectively define first and second rotor assemblies, the motor further comprising three or more rotor assemblies.

11. The motor according to claim 8, further comprising a third end ring and third bearing sleeve on an end of the first rotor section distal from the first end ring, and a fourth end ring and fourth bearing sleeve on an end of the second rotor section distal from the second end ring.

12. The motor according to claim 8, further comprising a key and key slots formed axially along opposing outer surfaces of each of the rotor sections and shaft, so that when the key is inserted into the key slots, each of the rotor sections and shaft are structurally affixed to one another.

13. The motor of claim 8, wherein an inner surface of the bearing sleeves is spaced radially away from the shaft.

14. The motor according to claim 8, wherein a rotational center of the first rotor section, the first end ring, and the first bearing sleeve is aligned with an axis of the motor.

* * * * *